United States Patent
Sanders et al.

(10) Patent No.: US 6,930,139 B2
(45) Date of Patent: Aug. 16, 2005

(54) ANTI-EXPLOSIVE FERTILIZER COATINGS

(75) Inventors: John Larry Sanders, Leawood, KS (US); Grigory Mazo, Wilmette, IL (US); Jacob Mazo, Wilmette, IL (US)

(73) Assignee: Specialty Fertilizer Products, LLC, Belton, MO (US); part interest ( * ) Notice: Subject to any disclaimer, the term of this patent is extended or adjusted under 35 U.S.C. 154(b) by 0 days.

(21) Appl. No.: 10/351,203

(22) Filed: Jan. 24, 2003

(65) Prior Publication Data

US 2004/0023031 A1 Feb. 5, 2004

Related U.S. Application Data

(60) Provisional application No. 60/352,117, filed on Jan. 24, 2002.

(51) Int. Cl.$^7$ ................................................. C08K 3/32
(52) U.S. Cl. ........................... 524/414; 524/47; 524/55; 524/416; 71/28; 71/64.02; 71/64.07; 71/64.11; 71/64.13; 526/271; 526/321; 526/330
(58) Field of Search ...................... 71/28, 64.02, 64.07, 71/64.11, 64.13; 526/271, 321, 330; 524/416, 47, 55, 414

(56) References Cited

U.S. PATENT DOCUMENTS

| | | | |
|---|---|---|---|
| 3,055,873 A | | 9/1962 | Hull |
| 3,306,729 A | * | 2/1967 | McPherson et al. ........... 71/41 |
| 3,366,468 A | | 1/1968 | Porter |
| 3,419,379 A | * | 12/1968 | Goodale et al. ............... 71/60 |
| 3,425,819 A | * | 2/1969 | Arveson et al. ............... 71/29 |
| 5,223,592 A | | 6/1993 | Hughes et al. |
| 5,472,476 A | * | 12/1995 | Schapira et al. ........... 71/64.12 |
| 6,518,382 B2 | * | 2/2003 | Sanders et al. ............. 526/321 |
| 6,525,155 B2 | * | 2/2003 | Sanders et al. ............. 526/321 |

FOREIGN PATENT DOCUMENTS

WO     WO 03/106377     * 12/2003

* cited by examiner

Primary Examiner—Helen L. Pezzuto
(74) Attorney, Agent, or Firm—Hovey Williams LLP

(57) ABSTRACT

Coatings for agricultural grade fertilizer particles and industrial grade ammonium nitrate are provided which when applied to particles form a protective film which acts as a barrier to inhibit or prevent hydrocarbon infiltration of the fertilizer particle pores and also to physically separate the fertilizer particles and hydrocarbon materials. In so doing, the coating greatly reduces the efficacy of the fertilizer particles as an oxidizing agent for use in incendiary devices, thereby deterring or preventing the use of agricultural grade fertilizers or industrial grade ammonium nitrate in creating weapons of terror.

19 Claims, No Drawings

ANTI-EXPLOSIVE FERTILIZER COATINGS

RELATED APPLICATION

This application claims the benefit of provisional application Ser. No. 60/352,117 filed Jan. 24, 2002 entitled ANTI-EXPLOSIVE FERTILIZER COATINGS, the teachings of which are incorporated herein by reference.

BACKGROUND OF THE INVENTION

1. Field of the Invention

The present invention is broadly concerned with a coating and methods of applying the coating to agricultural grade fertilizer particles. The coating inhibits the adsorption and absorption of hydrocarbons into the pores of the fertilizer particles thereby reducing the efficacy of the fertilizer as an oxidizing source in the production of incendiary devices. More particularly, the invention is concerned with coatings containing at least one polymer and methods of applying the coating to fertilizer products. The invention has particular utility in the deterrence or prevention of agricultural grade fertilizers and industrial grade ammonium nitrate being used to create weapons of terror.

2. Description of the Prior Art

Some common agricultural grade fertilizers generally comprise compounds which serve as excellent oxidizing agents, ammonium nitrate being one such compound. Generally, the fertilizer particles contain pores into which a number of other chemical agents can infiltrate, including hydrocarbon materials. The combined ammonium nitrate/fuel infiltrated particle is commonly referred to as ANFO (ammonium nitrate fuel oil). The article "Blasting Products" of the ANFO Manual distributed by El Dorado Chemical Company (St. Louis, Mo.), a copy of which is submitted herewith, is hereby incorporated by reference. When supplied with an ignition source, the hydrocarbon material acts as a fuel that is oxidized by the fertilizer particles. The resulting chemical reaction can release considerable amounts of energy, especially when the reactants are present in substantial quantities. To be most effective as an explosive, the ANFO will comprise about 5.7% by weight fuel oil. It is understood that when alternative sources of hydrocarbon fuel are used the fuel:ammonium nitrate ratio may need to be altered to achieve a stoichiometrically balanced mixture.

Both hydrocarbon fuels and fertilizers are readily available and relatively inexpensive products thereby making them excellent raw materials for producing renegade incendiary devices. The Oklahoma City bombing incident is one tragic example of how such materials may be used to perpetrate large-scale, terrorist atrocities.

During the manufacturing process, fertilizer particles are coated with an anti-dusting agent in order to reduce the amount of fertilizer dust produced during handling of the particles.

A commonly used anti-dusting agent is Galoryl (Lobeco Products Inc., Lobeco, S.C.) which is hydrocarbon based and is sprayed on during the manufacturing process. Being hydrocarbon based, this coating does not inhibit the infiltration of other hydrocarbon materials that may be used in constructing an incendiary device. Additionally, the anti-dusting agent does not form a protective barrier film encapsulating the entire fertilizer particle thereby leaving numerous pores exposed.

In order to prevent the misuse of ammonium nitrate in improvised explosives, it is necessary physically separate the fuel from the ammonium nitrate and also prevent the penetration of the liquid fuel into the fertilizer particles. If the fuel does not enter the interior of a sufficient number of particles in an optimal amount, the utility of ammonium nitrate particles as an oxidizer is substantially reduced or completely eliminated. There is a real need in the art for a fertilizer particle coating which forms a barrier that inhibits hydrocarbon infiltration of the fertilizer pores, and which will not alter the effectiveness of the fertilizer for its intended agricultural applications.

SUMMARY OF THE INVENTION

The present invention overcomes the problems outlined above and provides a coating for use with agricultural grade fertilizers and industrial grade ammonium nitrate. The coating should comprise a solution including at least one material which exhibits one or more of the following properties: substantially water soluble, substantially hydrocarbon insoluble, and capable of forming a film.

As used herein the term "substantially water soluble" means that the material may be contacted with water or a water-containing solvent mixture for a period of time up to approximately 24 hours and be transformed into a solution that contains at least 1% w/w of the material. The solution should be relatively stable meaning that the solute will not precipitate out of solution for at least about 3–4 hours. Various procedures may need to be employed to achieve this dissolution, such as heating and agitation. As used herein, the term "substantially hydrocarbon insoluble" means that the material will not dissolve in hydrocarbons to an extent greater than about 10% w/w upon exposure for a period of time up to approximately 48 hours at temperature and conditions of use.

With respect to simple conventional coating techniques, the pH of the solution may also play a role due to its effect on ammonia volatilization. Other coating techniques may reduce or eliminate the effect that pH has on ammonia volatilization. In preferred embodiments using the coating techniques which would have an effect on ammonia volatilization, the coating should have a pH of about 7.0 or less, preferably about 6.5 or less and more preferably about 5.5 or less. Those of ordinary skill in the art of coating will be able to use and develop coating methods which eliminate or reduce the volatilization of ammonia regardless of the pH of the coating. For example, spray drying or using a fluidized bed allow use of coatings with pH's above 7.0.

There is a wide range of materials which may be suitable for use in accordance with the present invention. Such materials include various natural and synthetic gums, starches and starch derivatives, polyethers, polysaccharides, polycarboxylates, poly-sulfonates, a wide range of monomers, polymers and copolymers, and combinations thereof. Among those materials for use with the invention are compositions that contain various mineral salts in addition to or instead of polymeric materials. Useful materials also include those that are known in the art of product formulation as flame and/or fire retardants. These include but are not limited to various boron-containing compositions such as borates, various metal salts including polymeric metal salts, oxides, carbides, nitrides, borides, silicates including polysilicates, silicides, aluminum-containing compositions, sulfates, phosphates, polyphosphates, chlorides, bromides, polymolybdates, molybdate salts, halogenated (particularly brominated) water-dispersible compounds with molecular weights above about 200 AMU. Ammonium phosphates are particularly preferred fire or flame retardant materials. As used herein, ammonium phosphate refers to any ammonium salt of any phosphate, including but not limited to any one chemical or combination of chemicals from the following list: ammonium phosphate, $NH_4H_2PO_4$; diammonium phosphate, $(NH_4)_2HPO_4$; ammonium polyphosphate, $(NH_4)$ salt of

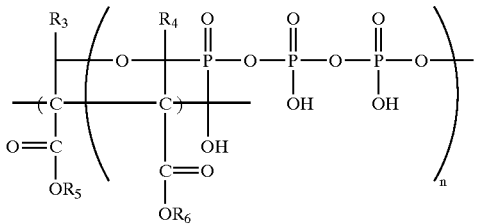

ammonium pyrophosphate, $(NH_4)_2H_2P_2O_7$; ammonium metaphosphate, $NH_4PO_3$; and ammonium orthophosphate. It is understood that such flame and/or fire retardant materials can be used alone in some instances, that is to say as the coating itself, or in combination with other materials suitable for use in the present invention. For example, ammonium phosphate may be used in combination with a polymer, and especially with those polymers disclosed herein.

It has even been found that ordinary water when applied to the fertilizer particles reduces the level of fuel oil infiltration by decreasing the total number of pores through dissolving and "re-drying" a portion of the fertilizer particle.

In one preferred embodiment, the coating material comprises a polymer, and more preferably a carboxylate polymer, especially one or more of those set forth in U.S. patent applications Ser. Nos. 09/562,579 and 09/799,210 which are hereby incorporated by reference as though fully set forth herein. Even more preferably the carboxylate polymer comprises a polymer of acrylic acid or it comprises at least two different moieties individually and respectively taken from the group consisting of A, B, and C moieties, recurring B moieties, and C moieties wherein moiety A is of the general formula

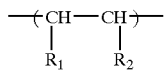

moiety B is of the general formula or

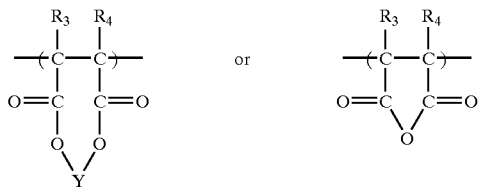

and moiety C is of the general formula

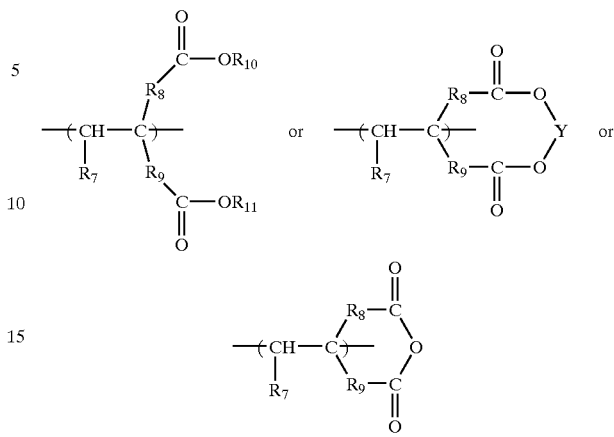

wherein $R_1$, $R_2$ and $R_7$ are individually and respectively selected from the group consisting of H, OH, $C_1$–$C_{30}$ straight, branched chain and cyclic alkyl or aryl groups, $C_1$–$C_{30}$ straight, branched chain and cyclic alkyl or aryl $C_1$–$C_{30}$, based ester groups (formate ($C_0$), acetate ($C_1$), propionate ($C_2$), butyrate ($C_3$), etc. up to $C_{30}$), $R'CO_2$ groups, and OR' groups, wherein R' is selected from the group consisting of $C_1$–$C_{30}$ straight, branched chain and cyclic alkyl or aryl groups; $R_3$ and $R_4$ are individually and respectively selected from the group consisting of H, $C_1$–$C_{30}$ straight, branched chain and cyclic alkyl or aryl groups; $R_5$, $R_6$, $R_{10}$ and $R_{11}$ are individually and respectively selected from the group consisting of H, the alkali metals, $NH_4$ and the $C_1$–$C_4$ alkyl ammonium groups, Y is selected from the group consisting of Fe, Mn, Mg, Zn, Cu, Ni, V, Cr, Si, B, Co, Mo, and Ca; $R_8$ and $R_9$ are individually and respectively selected from the group consisting of nothing (i.e., the groups are non-existent), $CH_2$, $C_2H_4$, and $C_3H_6$, at least one of said $R_1$, $R_2$, $R_3$ and $R_4$ is OH where said polymeric subunits are made up of A and B moieties, at least one of said $R_1$, $R_2$ and $R_7$ is OH where said polymeric subunits are made up of A and C moieties, and at least one of said $R_1$, $R_2$, $R_3$, $R_4$ and $R_7$ is OH where said polymeric subunits are made up of A, B and C moieties.

In the case of the polymer coatings comprising A and B moieties, $R_1$–$R_4$ are respectively and individually selected from the group consisting of H, OH and $C_1$–$C_4$ straight and branched chain alkyl groups, $R_5$ and $R_6$ are individually and respectively selected from the group consisting of the alkali metals.

One preferred polymer useful with the present invention comprises recurring polymeric subunits formed of A and B moieties, wherein $R_5$ and $R_6$ are individually and respectively selected from the group consisting of H, Na. K, and $NH_4$ and specifically wherein $R_1$, $R_3$ and $R_4$ are each H, $R_2$ is OH, and $R_5$ and $R_6$ are individually and respectively selected from the group consisting of H, Na, K, and $NH_4$ depending upon the specific application desired for the polymer. These preferred polymers have the generalized formula

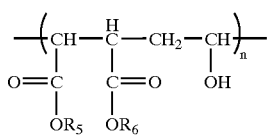

wherein $R_5$ and $R_6$ are individually and respectively selected from the group consisting of H, the alkali metals, $NH_4$ and $C_1$–$C_4$ alkyl ammonium groups (and most preferably, H, Na, K and $NH_4$ depending upon the application), and n ranges from about 1–10000 and more preferably from about 1–5000.

As can be appreciated, polymers useful in accordance with the present invention can have different sequences of recurring polymeric subunits as defined above. For example, a polymer comprising B and C subunits may include all three forms of B subunit and all three forms of C subunit. In the case of the polymer made up of B and C moieties, $R_5$, $R_6$, $R_{10}$, and $R_{11}$ are individually and respectively selected from the group consisting of H, the alkali metals, $NH_4$, and the $C_1$–$C_4$ alkyl ammonium groups. This particular polymer is sometimes referred to as a butanedioic methylenesuccinic acid copolymer and can include various salts and derivatives thereof.

Another preferred polymer useful with the present invention is composed of recurring polymeric subunits formed of B and C moieties and have the generalized formula

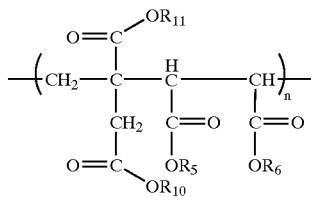

Preferred forms of this polymer have $R_5$, $R_6$, $R_{10}$, and $R_{11}$ individually and respectively selected from the group consisting of H, the alkali metals, $NH_4$, and the $C_1$–$C_4$ alkyl ammonium groups. Other preferred forms of this polymer are capable of having a wide range of repeat unit concentrations in the polymer. For example, polymers having varying ratios of B:C (e.g., 10:90, 60:40, 50:50 and even 0:100) are contemplated and embraced by the present invention. Such polymers would be produced by varying monomer amounts in the reaction mixture from which the final product is eventually produced and the B and C type repeating units may be arranged in the polymer backbone in random order or in an alternating pattern.

As noted above, it is possible to use polymers of the present invention in combination with other materials, such as fire and/or flame retardant materials. For example, one such combination would comprise a mixture of a polymer comprising B and C type repeating units and ammonium phosphate. When such a polymer comprising B and C type repeating units is used in combination with ammonium phosphate, the ammonium phosphate may comprise a substantial portion of the mixture. However, extremely high levels of ammonium phosphate do not impart appreciably better flame retardant properties in comparison to lower levels. Therefore, for purposes of the present invention, it is preferable that the mixture comprise between about 90–99% by weight polymer and 1–10% by weight ammonium phosphate, more preferably between about 93–97% by weight polymer and 3–7% by weight ammonium phosphate, and most preferably between about 94–96% by weight polymer and 4–6% by weight ammonium phosphate. Most preferably, ammonium phosphate comprises approximately 5% of the total weight of the polymer/ammonium phosphate mixture.

The polymers useful in accordance with the present invention may have a wide variety of molecular weights, ranging for example from 500–5,000,000, more preferably from about 1,500–20,000, depending chiefly upon the desired end use.

In many applications, and especially for agricultural uses, polymers used with the invention may be mixed with or complexed with a metal or non-metal ion, and especially ions selected from the group consisting of Fe, Mn, Mg, Zn, Cu, Ni, Co, Mo, V, Cr, Si, B, and Ca. Boron is especially preferred because it may reduce the explosivity or energy released during combustion of ANFO as demonstrated by its use in various fire retardant materials.

The coating may comprise an additional material dissolved or dispersed in the same solution as the first polymer described above. Such additional materials should be selected based on their ability to increase the hydrocarbon resistance of the coating. Examples of suitable materials include natural and synthetic gums, starches and starch derivatives, polyethers, polysaccharides, polycarboxylates, poly-sulfonates, and a wide range of polymers and copolymers. Polyvinyl alcohol (PVA) is one of the preferred materials in this respect. PVA is a material highly resistant to hydrocarbon diffusion to the point where protective gloves and fuel hoses are products made from PVA. PVA is available in a variety of grades with different hydrolysis levels and molecular weights. Higher molecular weights generally give rise to higher viscosity polymer solutions. Therefore lower molecular weights in the range of about 10,000 to 30,000 are preferred due to their ability to form thin films which coat the particle surface easily. High hydrolysis level PVA is also preferred because of its increased resistance to hydrocarbon diffusion compared to that of PVA with a lower degree of hydrolysis.

Solid PVA is not rapidly water soluble at room temperature and below, therefore it is preferable that PVA be used in companion with another material of the type previously described. The weight ratio of PVA to the other polymer should be between about 1:100 to 100:1, and more preferably between about 1:10 to 10:1 and most preferably about 1:3.

It is also within the scope of the present invention to provide a fertilizer coating comprising only PVA. As previously discussed, some agricultural applications will require fertilizer coatings which are more water soluble, in addition PVA is expected to be more expensive than other materials described above, therefore preferred embodiments of the invention contain PVA used in combination with other materials.

Coatings according to the invention should have a solids content of between about 5–70% by weight and more preferably between about 20–60% with the balance comprising water. The solids content largely depends upon the compatibility of the coating viscosity with the method of application to the fertilizer particles. It is most preferable that the fertilizer coating have a solids content of between about 10–30% by weight.

The coating is applied as a film to a fertilizer particle to form a coated fertilizer particle. Preferably the fertilizer particle used will be porous and will have a bulk density of about 40 to 60, more preferably about 40 to 50 and most preferably about 44 lbs/ft$^3$. However, less porous fertilizer particles with higher bulk densities are also suitable for use in accordance with this invention. Preferred fertilizer particles for use with the current invention are monoammonium phosphate (MAP), diammonium phosphate (DAP), any one of a number of well known N—P—K fertilizer products, and/or fertilizers containing nitrogen materials such as ammonia (anhydrous or aqueous), ammonium nitrate, ammonium sulfate, urea, ammonium phosphates, sodium nitrate, calcium nitrate, potassium nitrate, nitrate of soda, urea formaldehyde, metal (e.g. zinc, iron) ammonium phosphates; phosphorous materials such as calcium phosphates (normal phosphate and super phosphate), ammonium phosphate, ammoniated super phosphate, phosphoric acid, superphosphoric acid, basic slag, rock phosphate, colloidal phosphate, bone phosphate; potassium materials such as potassium chloride, potassium sulfate, potassium nitrate, potassium phosphate, potassium hydroxide, potassium carbonate; calcium materials, Such as calcium sulfate, calcium carbonate, calcium nitrate; magnesium materials, such as magnesium carbonate, magnesium oxide, magnesium sulfate, magnesium hydroxide; sulfur materials such as ammonium sulfate, sulfates of other fertilizers discussed herein, ammonium thiosulfate, elemental sulfur (either alone or included with or coated on other fertilizers); micronutrients such as Zn, Mn, Cu, Fe, and other micronutrients discussed herein; oxides, sulfates, chlorides, and chelates of such micronutrients (e.g., zinc oxide, zinc sulfate and zinc chloride); such chelates sequestered onto other carriers such as EDTA; boron materials such as boric acid, sodium borate or calcium borate; and molybdenum materials such as sodium molybdate. Of course, due to its explosive tendencies, ammonium nitrate is the most preferred fertilizer for purposes of the invention.

The coating is typically applied to the fertilizer particles at a level of from about 0.0001–4% by weight, and more preferably from about 0.01–1.0% by weight, and most preferably 0.25–0.5% by weight based upon the weight of the fertilizer taken as 100%. Additionally, when a coating material comprising carbon is employed, the quantity of carbon comprises about 0.2% by weight or less of the total weight of the coated particle. The film or coating should limit hydrocarbon infiltration of the fertilizer particle pores in comparison to an uncoated fertilizer particle, and preferably should reduce hydrocarbon infiltration by at least 10% in comparison to an uncoated fertilizer particle. Even more preferably, the film should reduce hydrocarbon infiltration by at least 50% and most preferably by at least 80%. Such hydrocarbon materials include fuel oil, diesel fuel, grease, wax, and other materials containing a preponderance of hydrocarbons. By preventing or inhibiting the infiltration of hydrocarbon materials into the fertilizer particle, the fertilizer particles have reduced explosivity tendencies, thereby reducing their usefulness as incendiary devices.

Another method of reducing the explosivity of agricultural grade fertilizer particles and industrial grade ammonium nitrate embraced by this invention is to selectively supply a quantity of water to the fertilizer particles. In so doing, a portion of the fertilizer particles dissolves thereby reducing the number of pores available for hydrocarbon infiltration. Finally, it is necessary to dry the fertilizer particles in order to avoid imparting to the quantity of particles undesirable characteristics such as clumping and caking.

Thus far, the description above has focused on the coatings and coated fertilizer particles on an individual particle level. When dealing with large quantities of coated fertilizer particles, especially coated ammonium nitrate particles, it is important to note that complete coating coverage of each individual particle is not always essential. It is possible for the coatings of the invention to reduce or completely eliminate the explosivity of the quantity of particles as a whole so long as a plurality of the particles are at least partially coated. It is even possible to mix quantities of coated and uncoated particles together and still produce a fertilizer mixture that has reduced explosivity characteristics. For even when fuel oil is added to this mixture of particles, the coated particles will absorb little or no fuel and some of the uncoated particles will become super-saturated with fuel oil. Both types of particles reduce the explosivity of the entire quantity of fertilizer particles. It may seem surprising that a super-saturated particle will reduce explosivity of the entire batch, however, if too much oil is added, the ability of the ammonium nitrate to oxidize the fuel oil is reduced. As noted in the El Dorado Chemical article referenced and incorporated above, there is an optimal percentage of fuel oil (about 5.7%) which maximizes the theoretical energy released in the detonation of ANFO. Adding more or less fuel oil tends to decrease the amount of energy released upon detonation. Therefore, such super-saturated fertilizer particles act to reduce the explosivity of the entire quantity of fertilizer particles.

Advantageously, coatings of the current invention also inhibit the formation of fertilizer dust normally associated with fertilizer handling. Therefore, coatings according to the invention are suitable for use as anti-dusting agents, and may be employed in place of current hydrocarbon based anti-dusting agents.

Generally, methods of forming coated fertilizer particles in accordance with the invention comprise the steps of providing a fertilizer particle and coating the particle with a film comprising at least one material selected from the group consisting of natural and synthetic gums, starches and starch derivatives, monomers and polymers and copolymers selected from the group consisting of polyethers, polysaccharides, polycarboxylates, polysulfonates, and mixtures thereof. Polymer and copolymer coatings are preferred. The coating may be applied to the fertilizer particle in any manner commonly known or used in the art, such as spraying. The precise coating procedure employed will be based an a number of factors including but not limited to the viscosity of the coating, particle surface morphology, particle size, density, and application equipment available. Regardless of the coating method used, it is preferred that the coating be applied in such a manner as to form an evenly distributed film which will provide an effective barrier against hydrocarbon infiltration of the fertilizer particle. Generally preferred embodiments of the fertilizer coating comprise a solution including at least one of a substantially water soluble material, a material substantially insoluble in hydrocarbon materials, a material capable of forming a film including a quantity of polyvinyl alcohol dissolved or dispersed therein, and combinations thereof.

Preferred embodiments of the coated fertilizer particle of the invention comprise a fertilizer particle coated with a film comprising at least one material. It is more preferable for the material to be substantially water soluble, or substantially insoluble in hydrocarbon materials or still more preferably substantially water soluble and substantially insoluble in hydrocarbon materials.

Preferred methods of forming the coated fertilizer particle of the invention comprise the steps of providing a fertilizer particle and coating the particle with a film comprising at least one material. Again, it is preferable for the material to be substantially water soluble, or substantially insoluble in hydrocarbon materials or still more preferably substantially water soluble and substantially insoluble in hydrocarbon materials.

The coating of the invention may also be used in combination with a fertilizer particle. It is generally preferable for the coating to comprise at least one material. It is preferable that the material be substantially water soluble, substantially insoluble in hydrocarbon materials, or capable of forming a film, or a combination thereof.

Ammonium nitrate is the most preferred fertilizer particle for use with the invention because, when combined with a fuel source such as hydrocarbon materials, it acts as a powerful oxidizer. When brought into contact with an ignition source, the ammonium nitrate has the potential to violently react with the fuel source releasing considerable amounts of energy.

The most preferred polymer coating of the invention comprises a quantity of PVA dissolved or dispersed in a solution comprising a BC type polymer as described above in a weight ratio of about 1:3 (PVA:BC). The most preferred coating will comprise about 10–30% polymer solids and will be water soluble, insoluble in hydrocarbon materials, capable of forming a film and will have a pH of about 7.0 or less. Most preferably the polymer coating will be applied to an ammonium nitrate fertilizer particle in Such as manner so as to form an evenly distributed film providing an effective barrier to hydrocarbon infiltration of the fertilizer particle pores.

DETAILED DESCRIPTION OF THE PREFERRED EMBODIMENT

The following examples describe preferred compositions and methods in accordance with the invention. It is to be understood that these examples are illustrations only and nothing therein should be deemed as a limitation upon the overall scope of the invention.

procedures. The most typical procedure was to weigh out an amount of the polymer solution to be coated onto a petri dish having a diameter of about 90 mm. All polymer solutions used in this experiment contained 50% by weight polymer. An appropriate amount of ammonium nitrate particles were weighed out and rolled onto the petri dish. The dish was then covered and the particles were vigorously swirled across the coating materials for several minutes. An alternative coating procedure was to weigh out an appropriate amount of ammonium nitrate particles and place them into a plastic bag equipped with a closure. The appropriate amount of polymer to be coated onto the ammonium nitrate particles was weighed and added to the bag. The bag contents were agitated vigorously for several minutes.

The coated granules were then placed into 20 mL glass vials and then saturated with diesel fuel. The diesel fuel is poured on top of the particles and then mixed with them by shaking the vial for approximately 10 minutes. The mixture was then allowed to stand for another 5 minutes to provide the fuel with the opportunity to soak into the particle and achieve intimate contact with the ammonium nitrate particles. The particles were then removed from the vials and placed on a filter with vacuum flow assist. The particles were then thoroughly washed with about 50 mL of tetrahydrofuran (THF). The filter liquid was discarded. The particles were collected from the filter and dried in a vacuum oven for about 10 minutes at about 25 in. Hg at a temperature of about 50° C. before being weighed. The difference between the coated particle weight and the washed and dried particle weight is the amount of fuel the particle retained. The results of these experiments are set forth in Table 1.

TABLE 1

| Sample # | Treatment type (% total particle weight attributed to coating) | Treatment (g 50% polymer soln.) | Ammonium nitrate particle weight (g) | Diesel fuel (g) | Washed & dried weight (g) | w/w % original fuel retained | % wt. fuel retained/ wt. washed particle |
|---|---|---|---|---|---|---|---|
| 0 | None | 0.000 | 9.050 | 1.021 | 9.118 | 7 | 0.7 |
| 1 | BC acid (1%) | 0.205 | 10.073 | 1.014 | 10.020 | ND | ND |
| 2 | BC NH4 salt, pH 3.5 (1%) | 0.208 | 9.984 | 1.040 | 9.971 | ND | ND |
| 3 | BC NH4 salt, pH 7 (1%) | 0.208 | 9.986 | 1.020 | 10.020 | ND | ND |
| 4 | BC Na salt, pH 4 (0.5%) | 0.100 | 10.057 | 1.083 | 10.079 | ND | ND |
| 5 | None | 0.000 | 11.658 | 1.165 | 11.794 | 8 | 0.8 |
| 6 | AB Na salt, pH 7 (1%) | 0.220 | 10.266 | 1.154 | 10.646 | 23 | 2.5 |
| 7 | C acid (1%) | 0.215 | 10.289 | 1.142 | 10.289 | ND | ND |
| 8 | AB Na salt pH 7 (1%) | 0.210 | 10.146 | 1.256 | 10.508 | 20 | 2.5 |
| 9 | BC NH4 salt pH 3.5 (0.5%) | 0.108 | 10.315 | 1.115 | 10.318 | ND | ND |
| 10 | B acid (0.5%) | 0.102 | 10.021 | 1.144 | 10.037 | ND | ND |
| 11 | BC NH4 salt, pH 3.5 (0.25%) | 0.057 | 10.190 | 1.168 | 10.279 | 5 | 0.6 |
| 12 | BC NH4 salt, pH 3.5 (0.125%) | 0.057 | 20.206 | 2.212 | 20.359 | 6 | 0.6 |
| 13 | B acid (0.25%) | 0.056 | 10.415 | 1.221 | 10.418 | ND | ND |
| 14 | C acid (0.25%) | 0.059 | 10.227 | 1.178 | 10.251 | ND | ND |
| 15 | BC acid (0.25%) | 0.062 | 10.652 | 1.173 | 10.632 | ND | ND |
| 16 | BC acid (0.125%) | 0.060 | 19.584 | 2.657 | 19.608 | ND | ND |
| 17 | Polyacrylic acid (0.25%) | 0.067 | 10.044 | 1.051 | 9.905 | ND | ND |

EXAMPLE 1

In this example, agricultural grade ammonium nitrate particles were coated with various polymeric materials, as set forth in Table 1, and then exposed to diesel fuel. The amount of diesel fuel retained by the coated particles compared to the original amount of diesel fuel added was then determined.

The ammonium nitrate particles were coated with the respective polymers according to one of the following two As used in Table 1 and subsequently:

AB indicates a 1:1 mole:mole copolymer of maleic acid and vinyl acetate prepared as disclosed in U.S. patent application Ser. No. 09/562,579;

BC indicates a 1:1 mole:mole copolymer of maleic acid and itaconic acid prepared as disclosed in U.S. patent application Ser. No. 09/562,519;

B indicates a homopolymer of maleic acid obtained from Rohm and Haas Chemicals (Philadelphia, Pa.);

C indicates a homopolymer of itaconic acid prepared according to a method similar to that of BC;

Polyacrylic acid obtained from Aldrich Chemical Company (Milwaukee, Wis.); and

ND indicates that the measurement was not detectable or below what could be measured.

Next a series of experiments were performed using the same test procedure above, however the diesel infiltration time was extended to 24 hours. The results are listed in Table 2.

TABLE 2

| Sample # | Treatment type (% total particle weight attributed to coating) | Treatment (g 50% polymer soln.) | Ammonium nitrate particle weight (g) | Diesel fuel (g) | Washed & dried weight (g) | w/w % original fuel retained | % wt. fuel retained/ wt. washed particle |
|---|---|---|---|---|---|---|---|
| 18 | None | 0.000 | 10.451 | 1.130 | 10.623 | 15.22 | 1.62 |
| 19 | BC acid (0.25%) | 0.053 | 10.134 | 1.059 | 10.299 | 13.08 | 1.34 |
| 20 | B acid (0.25%) | 0.053 | 10.137 | 1.176 | 10.235 | 6.08 | 0.70 |
| 21 | C acid (0.25%) | 0.062 | 10.061 | 1.165 | 10.160 | 5.84 | 0.67 |
| 22 | Acrylic acid (0.25%) | 0.067 | 10.233 | 1.075 | 10.364 | 9.07 | 0.94 |
| 23 | AB (0.25%) | 0.100 (g 25% soln.) | 10.313 | 1.121 | 10.385 | 4.19 | 0.45 |
| 24 | BC acid (0.25%) | 0.107 (g 25% soln.) | 10.131 | 1.091 | 10.210 | 4.79 | 0.51 |

The above data demonstrates that even incomplete and imperfect practice of the invention disclosed herein is highly beneficial. It was further determined that polycarboxylate-containing materials are useful barrier coatings and help decrease diesel fuel infiltration into ammonium nitrate particles under the experimental conditions tested. However, the materials do not give perfect protection when used alone at lengthy exposure times.

EXAMPLE 2

The purpose of this example was to optimize diesel fuel resistance of two-component coatings. In these experiments, porous paper, S&S paper type #404 (Schleicher & Schuell, Dassel, Germany), was used to simulate porous ammonium nitrate particles. Upon examination using a low-power microscope, the porous paper had generally similar porosity to that of high porosity ammonium nitrate. The porous paper had the added advantage of being of substantially uniform porosity whereas the ammonium nitrate granules were of varying shape and porosity.

In the first experiment, the optimal percent of polymer solids in a coating was determined. The polymer coatings tested were polymaleic acid, sodium polymaleate at pH 3.5, itaconic acid homopolymer, polyacryilc acid, and BC acid polymer. The coating was applied to an 80×80 mm area on a sheet of porous paper by placing small drops of aqueous coating solution to the paper and spreading them to cover the test area using an inert plastic ruler. The coating was allowed to dry. Next, diesel fuel was dripped onto the coated area and the penetration, or lack thereof, was noted. It was determined that the range of polymer solids in the coating could be about 5–70% by weight, with the range about 10–30% by weight being preferred.

The next experiments involved addling polyvinyl alcohol, PVA, (Celvol 103 by Celanese Chemicals, Dallas, Tex.), a chemical known for its resistance to hydrocarbon diffusion, to the BC acid polymer coating in order to increase the coating's resistance to diesel fuel penetration. BC acid polymer was used because its performance was superior to the other coatings in the porous paper test described above. Because PVA is much more expensive than BC acid polymer it was desirable to determine the optimal ratio of PVA to BC acid polymer. The optimal ratio of PVA to BC acid polymer was about 1:3 by weight. The optimal mixture was prepared at about 20% w/w total dissolved solids by mixing appropriate amounts of water and BC acid polymer solution at room temperature. In this solution, PVA was dissolved or dispersed and the solution subsequently heated to about 90–95° C. with very vigorous, non-aerating agitation. The mixture was cooled to room temperature, at which time it had a consistency suitable for making coatings. The coating was applied to porous paper in the manner described above. The coating was hard, low-color, smooth to the touch after drying, non-hygroscopic and easily dissolved in water. The percent solids used is dictated by the compatibility with the application technique chosen. In practice, any percent solids solution can be used as long as the coating solution is sufficiently mobile under application conditions to create useful coatings. A useful coating is one that provides an effective barrier to fuel infiltration by being a thin film that coats and covers the particle surface.

Through these experiments, and for the chosen application method, it was determined that a 1:3 weight ratio of PVA to BC acid polymer was the most effective coating in preventing diesel fuel infiltration.

EXAMPLE 3

In this example, an alternative method of applying the polymer coating to the fertilizer particles was explored. The method involved placing a piece of flat round filter paper (S&S paper type #404) into a 5.5 inch diameter petri dish so that the paper occupies the entire bottom of the dish. About 2.9 g of the 20% w/w solution prepared in Example 2 is spread onto the paper until the paper is saturated with the liquid, but not to the point where there is liquid on the paper surface. The filter paper should be slightly moist to the touch. About 13 g of ammonium nitrate particles are poured onto the paper surface and rolled around the petri dish for about 1 minute, then removed. The particles are allowed to dry for 15 minutes in the air. This method was found to be highly effective as particles coated using this method do not tend to stick together and are dry and smooth to the touch.

Any method of particle coating known in the art, such as spraying, may be employed to apply the coating to the ammonium nitrate granules so long as the method results in a sufficient fraction of the surfaces of the fertilizer particles being coated to a sufficient degree. It is preferable to have particles coated with a relatively thin layer of coating so as to reduce the expense involved, preserve fertilizer analysis values, reduce water levels added to the fertilizer and reduce material handling requirements.

EXAMPLE 4

In this experiment, small particle size, high porosity ammonium nitrate granules coated with a factory applied anti-dusting agent, Galoryl, were tested for diesel fuel infiltration.

Typically, porous materials with high surface area per unit weight are very difficult to coat effectively, in addition, such material is optimized for high and very rapid uptake of fuel.

The granules, obtained from El Dorado Chemical Company (St. Louis, Mo.), were first tested without applying any polymer coating according to the diesel fuel absorption method described in Example 1. The particles retained about 49% of the diesel fuel added to them, and had a fuel content of about 5% w/w after a solvent wash as described in Example 1.

Another batch of granules were tested after removal of the factory applied anti-dust coating. The anti-dust coating was removed by washing the particles several times in THF and subsequently drying the particles under vacuum overnight at 50° C. The de-coated particles had very similar fuel absorption characteristics to those with the factory applied anti-dusting coating.

Next, samples of both factory coated and de-coated particles were coated with the 1:3 weight ratio PVA to BC polymer described in Example 2 and tested for diesel fuel infiltration using the method described in Example 1, however the exposure time was increased to 15 minutes rather than 5 minutes after the 10 minute mix time. The diesel infiltration for de-coated particles was below 0.2–0.3% of the particle weight with less than 3% of the original fuel being retained. The factory coated particles did not absorb any detectable diesel fuel.

This experiment illustrates the high barrier performance of the composition and coating application method under conditions which are generally very favorable for diesel fuel absorption and retention, such as small particle size, high surface area per unit weight, and high porosity. It is understood that for standard agricultural grades of ammonium nitrate, which is normally non-porous and has large particle sizes with low surface areas, this coating method would be even more effective.

EXAMPLE 5

This example demonstrates that treatment with water alone substantially improves the inhibition of hydrocarbon infiltration into fertilizer particles. The procedure of Example 1 was followed with two exceptions. The first exception was that the particles for this example were soaked in diesel fuel for 10 minutes. The second exception was that the particles were washed with methylene chloride rather than THF. Generally, diesel fuel was added to El Dorado Chemical's low density Ammonium Nitrate coated with Galoryl. Particles with no additional coating were then compared with particles which were sprayed with a 0.5 gal/ton coating of the previously described 50% BC polymer, particles which were sprayed with a 1.0 gal/ton coating of the previously described 25% BC polymer, and with particles that were sprayed (treated) with 0.5 gal/ton of water. The particles were then soaked with diesel fuel for 10 minutes and washed with methylene chloride before being tested for their differences in diesel fuel oil retention. The results of this example are provided below in Table 3.

TABLE 3

| Treating Agent | Concentration (Gal/ton) | % Difference in Diesel Oil Retention Compared With The 50% BC Polymer |
|---|---|---|
| CK-None | — | 100 |
| 50% BC | 0.5 | 0.00 |

TABLE 3-continued

| Treating Agent | Concentration (Gal/ton) | % Difference in Diesel Oil Retention Compared With The 50% BC Polymer |
|---|---|---|
| 25% BC | 1.0 | 0.03 |
| Water | 0.5 | 25.00 |

As shown by these results, simply spraying the particles with water helps to increase their resistance to hydrocarbon penetration in this manner, water does not serve as a coating. Instead, the particle surface is melted away, thereby permitting less intrusion of hydrocarbons into pore spaces.

We claim:

1. A fertilizer coating comprising:

a substantially water soluble material in solution, said water soluble material comprising an ammonium polyphosphate and a material selected from the group consisting of carboxylate polymers, natural and synthetic gums, starches, starch derivatives, and mixtures thereof.

2. The coating of claim 1, said carboxylate polymer being polyacrylic acid or being made up of at least two different moieties individually and respectively taken from the group consisting of A, B, and C moieties, recurring B moieties, or recurring C moieties wherein moiety A is of the general formula

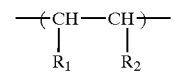

moiety B is of the general formula

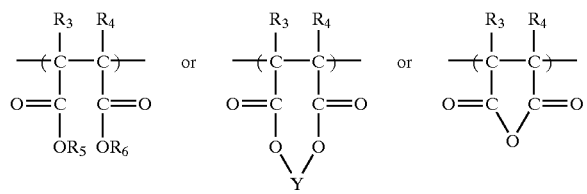

and moiety C is of the general formula

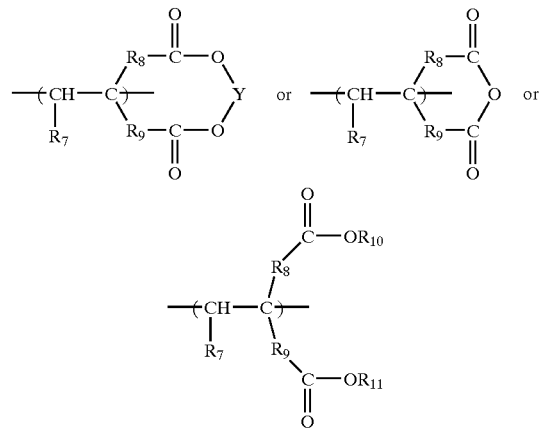

wherein $R_1$, $R_2$ and $R_7$ are individually and respectively selected from the group consisting of H, OH, $C_1$–$C_{30}$ straight, branched chain and cyclic alkyl or aryl groups, $C_1$–$C_{30}$ straight, branched chain and cyclic alkyl or aryl $C_1$–$C_{30}$ based ester groups, $R'CO_2$ groups, and $OR'$ groups, wherein $R'$ is selected from the group consisting of $C_1$–$C_{30}$ straight, branched chain and cyclic alkyl or aryl groups; $R_3$ and $R_4$ are individually and respectively selected from the group consisting of H, $C_1$–$C_{30}$ straight, branched chain and cyclic alkyl or aryl groups; $R_5$, $R_6$, $R_{10}$ and $R_{11}$ are individually and respectively selected from the group consisting of H, the alkali metals, $NH_4$ and the $C_1$–$C_4$ alkyl ammonium groups, Y is selected from the group consisting of Fe, Mn, Mg, Zn, Cu, Ni, Co, Mo, V, Cr, Si, B, and Ca; $R_8$ and $R_9$ are individually and respectively selected from the group consisting of nothing, $CH_2$, $C_2H_4$, and $C_3H_6$, at least one of said $R_1$, $R_2$, $R_3$ and $R_4$ is OH where said polymeric subunits are made up of A and B moieties, at least one of said $R_1$, $R_2$ and $R_7$ is OH where said polymeric subunits are made up of A and C moieties, and at least one of said $R_1$, $R_2$, $R_3$, $R_4$ and $R_7$ is OH where said polymeric subunits are made up of A, B and C moieties.

3. The coating of claim 2, wherein said recurring polymeric subunits are made up of A and B moieties, wherein $R_1$, $R_3$ and $R_4$ are each H, $R_2$ is OH, $R_5$ and $R_6$ are Na.

4. The coating of claim 2, wherein $R_1$–$R_4$ are respectively and individually selected from the group consisting of H, OH and $C_1$–$C_4$ straight and branched chain alkyl groups, $R_5$, $R_6$, $R_{10}$ and $R_{11}$ are individually and respectively selected from the group consisting of the alkali metals, $NH_4$ and H.

5. The coating of claim 2, wherein said recurring polymeric subunits are made up of B and C moieties, wherein $R_3$ and $R_4$ are each H, and $R_5$ and $R_6$ are Na.

6. The coating of claim 2, wherein $R_4$ is individually and respectively selected from the group consisting of H, OH and $C_1$–$C_4$ straight and branched chain alkyl groups, $R_5$, $R_6$ and X are individually and respectively selected from the group consisting of alkali metals.

7. The coating of claim 1, said carboxylate polymer being complexed with an ion.

8. The coating of claim 7, said ion being selected from the group consisting of Fe, Mn, Mg, Zn, Cu, Ni, Co, Mo, V, Cr, Si, B, and Ca.

9. The coating of claim 1 further comprising a quantity of polyvinyl alcohol dissolved or dispersed in said solution.

10. The coating of claim 1, the weight ratio of said polyvinyl alcohol to said material being between about 1:10 to 10:1.

11. The coating of claim 10, the weight ratio of said polyvinyl alcohol to said material being about 1:3.

12. The coating of claim 1, said material being insoluble in hydrocarbon materials.

13. The coating of claim 1, said material being capable of forming a film.

14. The coating of claim 1, said solution having a pH of about 7.0 or below.

15. A fertilizer coating comprising:

a substantially hydrocarbon insoluble material in solution, said material comprising an ammonium polyphosphate and a material selected from the group consisting of carboxylate polymers, natural and synthetic gums, starches, starch derivatives, and mixtures thereof.

16. A fertilizer coating comprising:

a material capable of forming a film, said material comprising an ammonium polyphosphate and a material selected from the group consisting of carboxylate polymers, natural and synthetic gums, starches, starch derivatives, and mixtures thereof.

17. The coating of claim 1, said material comprising between about 1–10% by weight ammonium polyphosphate.

18. The coating of claim 1, said material comprising between about 90–99% by weight of a carboxylate polymer.

19. The coating of claim 1, said material having a solids content of between about 5–70% by weight.

* * * * *